United States Patent [19]
Kawai

[11] 3,982,110
[45] Sept. 21, 1976

[54] INPUT TRANSFER SYSTEM FOR ELECTRONIC COMPUTER
[75] Inventor: Yoshio Kawai, Tokyo, Japan
[73] Assignee: Kureha Kagaku Kogyo Kabushiki Kaisha, Tokyo, Japan
[22] Filed: Dec. 12, 1974
[21] Appl. No.: 532,103

[30] Foreign Application Priority Data
Dec. 13, 1973   Japan .............................. 48-139499

[52] U.S. Cl. ............................. 235/151.3; 73/361; 340/347 AD
[51] Int. Cl.² ..................... H03K 13/02; G01K 7/12
[58] Field of Search ........... 235/151.3, 151; 73/355, 73/361; 176/19; 340/347 AD

[56] References Cited
UNITED STATES PATENTS
| | | | |
|---|---|---|---|
| 3,147,370 | 9/1964 | Lowman | 235/151.13 |
| 3,201,572 | 8/1965 | Yetter | 235/151 |
| 3,247,498 | 4/1966 | Sadvary et al. | 235/151.3 |
| 3,459,925 | 8/1969 | Goosey et al. | 235/151 |

*Primary Examiner*—Edward J. Wise
*Attorney, Agent, or Firm*—Sughrue, Rothwell, Mion, Zinn and Macpeak

[57]   ABSTRACT

A multipoint temperature indicator and/or recorder whose output analogue signals are automatically transferred and sequentially introduced into a computer is used as an input transfer system for the computer. Preferably, the multipoint temperature indicator and/or recorder contains means for compensating for the cold-point temperature of thermoelectric couples, means for correcting the linearity of the output analogue signals, means for delivering input instruction signals to the computer, and means for delivering at least one measuring position indicating signal to the computer, whereby the input circuits and the programming of the computer can be substantially simplified.

3 Claims, 4 Drawing Figures

INPUT TRANSFER SYSTEM FOR ELECTRONIC COMPUTER

BACKGROUND OF THE INVENTION

1. Field of the Invention

This invention relates to an input transfer system for an electronic computer, and more particularly to a type thereof made of a multipoint temperature indicator-recorder so that input analogue signals for the computer are thereby automatically transferred and sequentially introduced into the computer.

2. Description of the Prior Art

It is widely known that the installation cost of an input system and output system for a computer comprises a considerable part of the entire cost required for a computer-controlled process control system, and that the entire cost and hence the mounting area of the system can be substantially reduced by simplifying the input system and the output system.

After intensive study in substituting the input system a commercially available device for the input system, it has been found that a multipoint temperature indicator and/or recorder (hereinafter called a multipoint temperature indicator-recorder), which has an input transferring function and is readily available on the market, can perform a more versatile role than those for which it has been designed.

In designing a computer-controlled process control system, the conventional practice has been to consider the process from the computer side so that the input signals are read into the computer under the control of instruction signals issued from the computer.

According to the present invention, this manner of consideration is reversed, and the input signals are read into the computer under the control of instruction signals issued from the multipoint temperature indicator-recorder. By this procedure, the input transfer system which is produced according to the precise standards for computers and hence costly, can be replaced by a comparatively inexpensive multipoint temperature indicator-recorder manufactured according to the industrial standards.

SUMMARY OF THE INVENTION

Therefore, a primary object of the present invention is to provide an input transfer system for a computer in a computer-controlled process control system, which is far more economical than the conventional input transfer system, but nevertheless can replace a substantial part of functions of the conventional input transfer system.

Another object of the invention is to provide an input transfer system for a computer in a computer-controlled process control system, the size of which system is much smaller than the conventional input transfer system, but it can carry out some part of the functions of the computer.

These objects and other objects of the present invention, which will be made apparent herein, are achieved with an improved input transfer system for a computer which comprises a multipoint temperature indicator-recorder whose output analogue signals are automatically transferred and sequentially introduced into the computer.

In a preferred embodiment, the multipoint temperature indicator-recorder contains cold-point compensating means and linearity correcting means therewithin, whereby the input circuits and the programming device in the computer can be substantially simplified.

Preferably, the multipoint temperature indicator-recorder can deliver read-in instruction signals and measuring point indicating signals so that the burden of the computer is greatly reduced.

The nature, principal, and utility of the invention will be more fully understood from the following detailed description of the invention, with respect to a preferred embodiment thereof, when read in conjunction with the accompanying drawings.

DETAILED DESCRIPTION OF THE INVENTION

Figure 1:
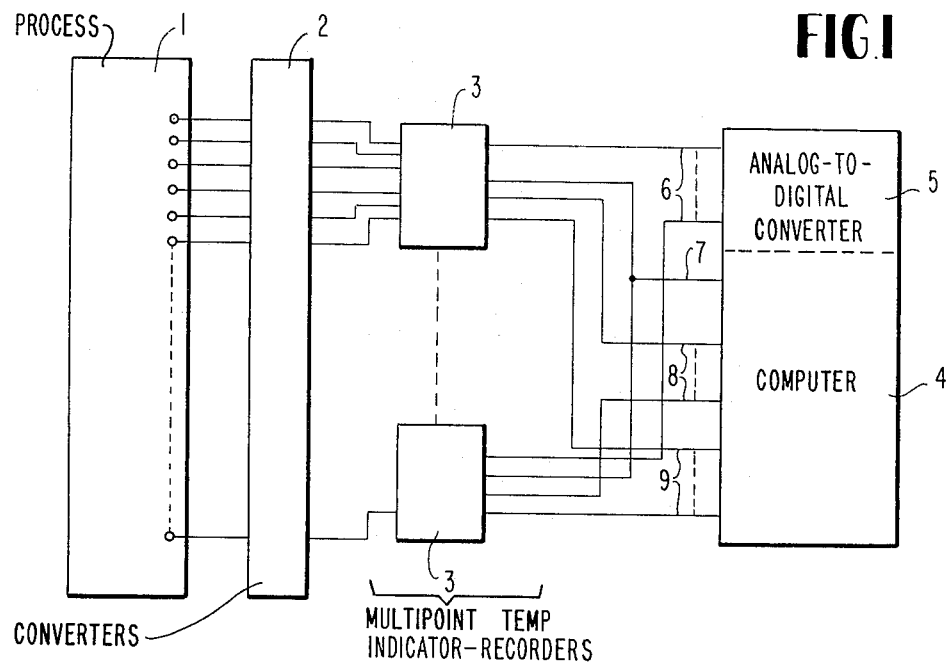
FIG. 1 is a block diagram showing a general arrangement of a computer-controlled process control system utilizing a plurality of input transfer devices according to the present invention.

Referring now to FIG. 1 showing a general arrangement of a computer-controlled process control system, process 1, the temperatures at various points of which are measured and converted by a converter 2 into electric signals corresponding to the temperatures are indicated. The electric signals delivered from the converter 2 are applied to a plurality of multipoint indicators and/or recorders 3 wherein the temperatures are displayed on the indicators and/or recorded by recording pens. Simultaneously therewith, the electric signals are again converted into analogue signals by means of, for instance, variable resistors interconnected with needles of the indicator and/or recorders, and are delivered through analogue signal lines 6 to an A/D converter 5 in a computer 4. In this arrangement, for instance, the coldpoint compensation of thermoelectric couples, linearity correction for the measurements, and the electric current supply to the resistance thermometer bulb can be accomplished by the multipoint indicator-recorder 3 so that the load of the computer 4 can be greatly reduced. Where the multipoint indicator and/or recorder 3 has a multi-range scaling, the range now selected can be input to the computer by providing separate contacts. Each time the multipoint indicator-recorder 3 automatically transfers the points measured, a read-in instruction signal is delivered from the multipoint indicator-recorder 3 through a read-in signal line 7 to the computer just before the transferring operation of the indicator 3.

Upon receipt of the read-in instruction signal sent over the signal line 7, the computer 4 investigates the number of the specific multipoint indicator-recorder 3 which has issued the read-in instruction signal and the number of the specific measuring points from the input signals through a recorder number signal line 8 and a measuring point number signal line 9, and operates the A/D converter 5 thereby to read the output from the specific multipoint indicator-recorder 3 and to memorize the output in the corresponding address.

As for the detailed arrangement for exchanging information between the recorder 3 and the computer 4, various procedures can be considered besides that of the above described arrangement. For instance, input terminals corresponding to the individual recorders 3 can be provided in the computer 4, and all of the recorders 3 can be connected with the computer separately through these input terminals, or conversely, the readin instruction lines 7 and the output lines connected to the A/D converter 5 from all of the multipoint indicator-recorders 3 can be combined into a common instruction line and a common output line, respectively, and the common instruction line and output line can be connected through an outwardly provided interlock to the computer 4 so that the introduction of more than one signal at a time can be thereby prevented. Furthermore, the interlock can be of a type allowing the transfer action of the multipoint indicator-recorder 3 to be instructed from the computer 4. In addition, a system in which a specific signal is issued from the indicator-recorder 3 only in response to the No. 1 measuring point, and the outputs for the subsequent measuring points are introduced into the corresponding addresses by simply counting the order of the positions of the measuring points can be provided. In this way, the number of digital inputs of the computer 4 can be substantially decreased. In the example shown in FIG. 1, only the readin instruction lines 7 are combined into a common line.

Figure 2:
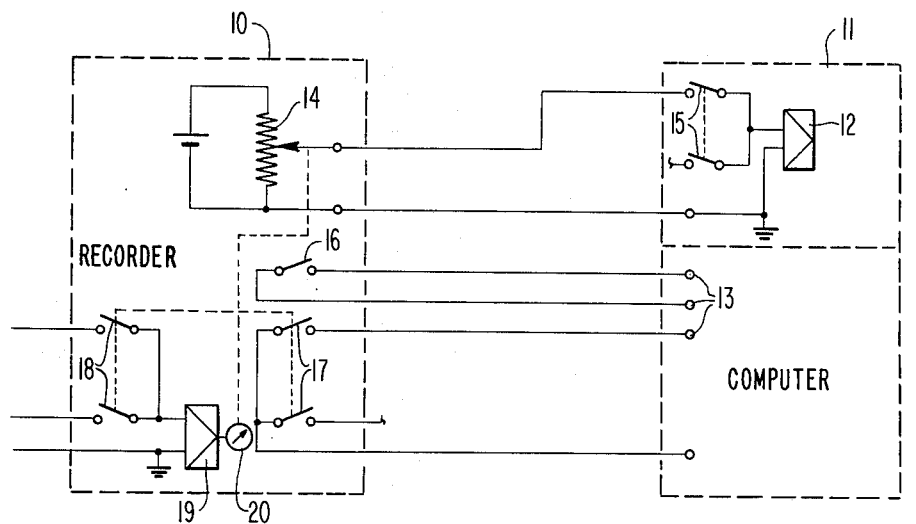
FIG. 2 is a connection diagram between a multipoint temperature indicator-recorder according to the present invention and an electronic computer.

FIG. 2 shows a detailed connection between the multipoint indicator-recorder 3 and the computer 4 in FIG. 1, wherein only the readin instruction lines are combined into a common line. In FIG. 2, numeral 10 designates a six point recorder, numeral 11 a computer, 12 an A/D converter, 13 digital inputs, 14 a voltage-output producing resistor, 15 switching means for the A/D converter, 16 a readin signal contact, 17 measuring-point number signal contacts, 18 measuring points transferring contacts (ganged with the transferring contacts 17), 19 an amplifier and the related circuit, and numeral 20 designates an indicating mechanism (interlinked with the resistor 14).

Figure 3:
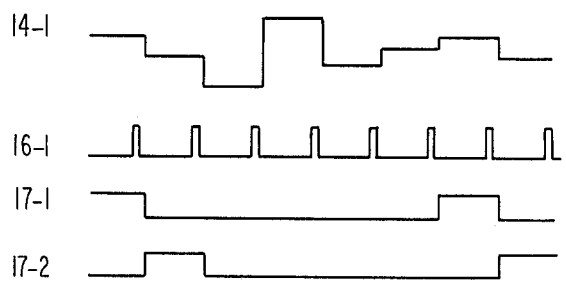
FIG. 3 is a timing chart of various signals delivered from the multipoint temperature indicator-recorder which is used as an input transfer system according to the present invention.

In FIG. 3, an example of a timing chart showing variations in accordance with time of voltage outputs from the recorder 10, and also timing of the operations of the transfer contacts is shown. In this figure, 14-1 represents the output voltage of the recorder 10 which is varied in proportion to the process variables (amended) for the measuring points. 16-1 represents the read-in instruction signal delivered from the recorder 10, which is produced by closing the contact 16 for a short time just before a measuring point is transferred to another measuring point. 17-1 through 17-6 represent signals indicative of the measuring points, which are produced by closing the contacts associated with these points, respectively. Multipoint selective alarm contacts, if any, in the recorder 10 can be utilized for the contacts producing the signals 17-1 through 17-6. With the above described, the computer 11 can read the values of the process variables and memorize the values in the corresponding memory addresses.

Figure 4:
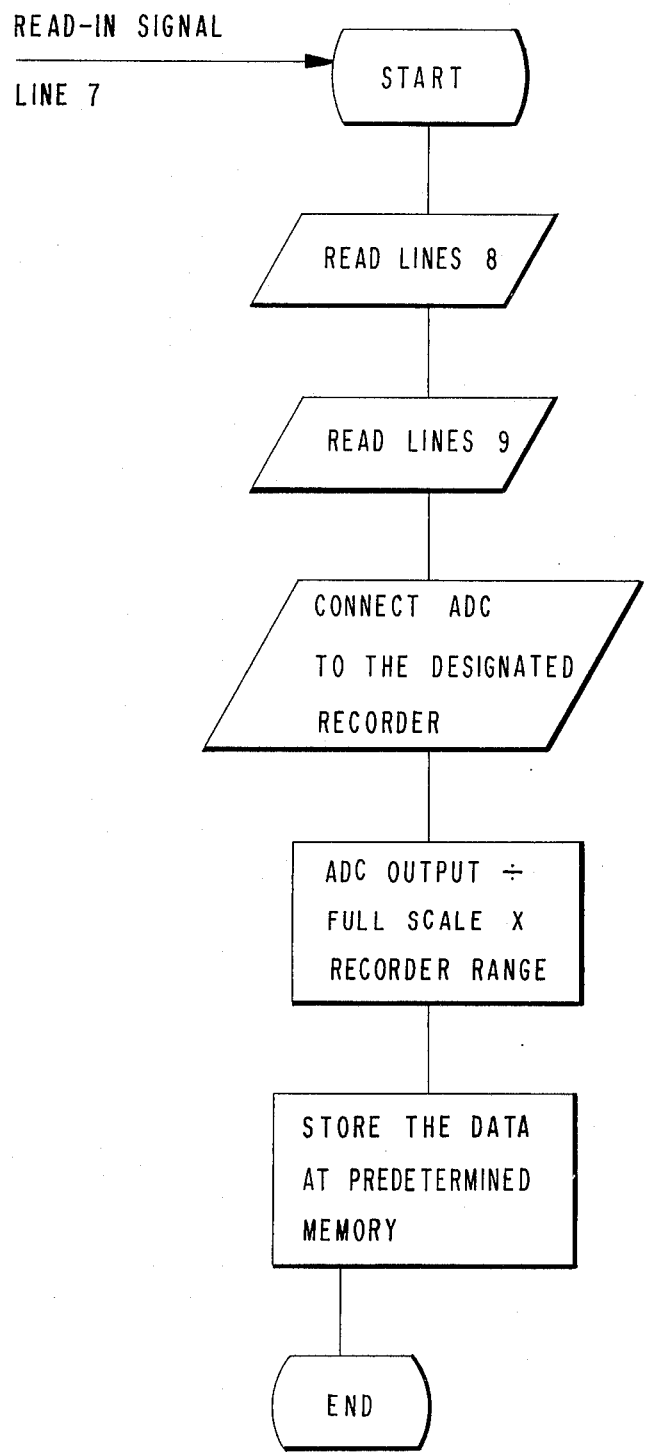
FIG. 4 is a flow diagram of the sequence control according to the present invention.

In FIG. 4, there is shown a flow chart of the sequence control performed by the computer 4. The control is started with an interrupt signal, and the first sequence step is to detect the recorder number on lines 8 which produced the read-in signal. The measuring point number is then detected on lines 9. Once the recorder number and the measuring point number have been detected, the A/D converter is connected to line 6 of the recorder detected on lines 8. By dividing the A/D converter output by the full scale of the indicator-recorder, a ratio for the recorder full scale is obtained. Then by multiplying this ratio with the recorder range, a temperature is obtained. The temperature in digital form is stored in memory according to the recorder number and the measuring point.

It is also possible to provide a holding circuit and an interlock circuit for improving the reliability of the transfer system according to the present invention, and these circuits can be released under the control of the readin completion signal from the computer.

From the above description, some of the characteristic features of the present invention can be summarized as follows.

1. The multipoint recorder has been widely used for measurement of temperature when the variation in time is comparatively slow, and by coupling the multipoint recorder after a slight modification with a computer, the installation cost and the mounting area of the computer system can be substantially economized.

2. Ordinarily, input transfer devices for a computer are designed and manufactured in accordance with the specification for computers, and for this reason, they are costly and of a comparatively large size although of high precision. For a great part of applications, a degree of precision for the industrial instruments is sufficient in use, and in view of the fact that the accuracy of the measurement is substantially determined by the allowance of the converter (ordinarily 0.5%), the use of the multipoint recorder as an input transfer device for the computer does not necessarily degrade the precision of the measurements.

3. Where thermoelectric couples are used in the inputs of a computer, cold-point temperature compensating circuits and circuits for calculating and correcting lack of linearity in the temperature-voltage characteristic of the thermoelectric couples are required. The multipoint temperature recorder contains cold-point temperature compensating circuits therewithin, and since the lack of linearity of the characteristic can be compensated with a variable resistor, the output voltage of the multipoint recorder can be proportioned with the temperature measured at that time, whereby the programming of the computer can be greatly simplified.

4. As for the functions to be added to the multipoint recorder for enabling instructions to be issued the computer for operating the computer to read an input signal or in other operations, the multipoint selective alarming circuit of the same recorder can be utilized as it is, and no modification or alteration is required.

5. The disadvantage of this transfer system resides in the facts that the system cannot be used for process variables of quick variation, and in applications where a higher precision than that of the industrial instruments is required.

6. As for the programming for the computer, calculations for correcting the inputs are not required, but instead a programming for reading the inputs upon reception of corresponding signals from the multipoint recorder is required. However, the latter program is for a sequence control which is much simpler than the programs required for the calculations. Thus, the construction of the computer can be simplified to an extent corresponding to the difference of the required programs, and the capacities of the memories can be greatly reduced.

7. Since the number of analogue inputs can be reduced to 1/$n$ ($n$ representing the number of positions of the multipoint recorder), the required number of input circuits in the computer can be substantially reduced. For instance, the number of input circuits in the computer of this example can be reduced to 1/6 (because of the use of the six-position multipoint recorder in this example), and if the number of positions in the multipoint recorder is increased to 12, the number of the input circuits in the computer can be reduced to 1/12. Furthermore, if a separate interlock circuit is provided for preventing simultaneous introduction of input signals, the number of input circuits can be reduced to only one. Although digital inputs such as the measuring point desingnating input signals are increased in this case, the cost per unit of the digital inputs is far cheaper than the cost per unit of the analogue inputs, whereby the entire cost of the computer can be further reduced.

While the invention has been described in detail and with reference to specific embodiments thereof, it will be apparent to one skilled in the art that various changes and modifications can be made therein without departing from the spirit and scope thereof.

I claim:

1. In a computer-controlled process control system including means for measuring a plurality temperatures at various points in the process and generating electric signals corresponding to the temperatures measured, a plurality of multi-point temperatures indicator-recorders connected to said measuring means and displaying and/or recording the measured temperatures, said multi-point temperature indicator-recorders including linearity correcting means connected to outputs thereof for correcting the linearity of output analog signals, and an electronic digital computer for controlling the process, said computer having an analog-to-digital converter for converting input analog signals to digital signals for processing by said computer, the improvement comprising an input transfer system for automatically transferring and sequentially introducing the analog signals from each of said multi-point temperature indicator-recorders to said analog-to-digital converter in said computer, said transfer system including means in said multi-point temperature indicator-recorders for delivering input instruction signals to said computer to cause the automatic transfer of said analog signals.

2. The system as set forth in claim 1, wherein said measuring means includes a plurality of thermocouples and each of said plurality of multi-point indicator-recorders further includes means for compensating for the cold-point temperature of said thermocouples.

3. The system as set forth in claim 2, wherein each of said multi-point temperature indicator-recorders further includes means for delivering at least one measuring position indicating signal to said computer.

* * * * *